G. KURSCHUS.
CLUTCH FOR PUNCH PRESSES.
APPLICATION FILED JUNE 22, 1911.

1,012,657.

Patented Dec. 26, 1911.

Witnesses
Harold O. Van Antwerp
Anna De Windt

Inventor
George Kurschus
By Luther V. Moulton
Attorney

COLUMBIA PLANOGRAPH CO., WASHINGTON, D. C.

UNITED STATES PATENT OFFICE.

GEORGE KURSCHUS, OF HASTINGS, MICHIGAN.

CLUTCH FOR PUNCH-PRESSES.

1,012,657. Specification of Letters Patent. Patented Dec. 26, 1911.

Application filed June 22, 1911. Serial No. 634,670.

*To all whom it may concern:*

Be it known that I, GEORGE KURSCHUS, a citizen of the United States of America, residing at Hastings, in the county of Barry and State of Michigan, have invented certain new and useful Improvements in Clutches for Punch-Presses; and I do hereby declare the following to be a full, clear, and exact description of the invention, such as will enable others skilled in the art to which it appertains to make and use the same.

My invention relates to improvements in clutches, and more particularly to clutches for punch presses and its object is to provide a clutch that is durable, easily repaired and having adjustable contacting surfaces whereby lateral strains on the shaft are avoided in case the device is not accurately constructed in the first instance, and to provide the same with various new and useful features hereinafter more fully described and particularly pointed out in the claims.

The clutch for driving a punch press is subjected to extraordinary stress and unless very accurately fitted there is liable to be lateral strains on the shaft. There is also a considerable stress and wear upon these clutches so that they require frequent repairing of the contacting members.

My invention consists essentially of engaging clutch members cylindrical in form rotatively adjustable in the hub of the fly wheel and having concave portions adapted to receive the ends of pins inserted in a slidable collar splined to the shaft, these pins and engaging members being easily made of hardened steel and readily replaced when they become worn, and the adjustable members adapted to readily adjust to accurately fit the surface of the pins, the pins being also rotatively adjustable to bring the wear on different portions of their circumference whereby these parts are durable and readily replaced as occasion may require.

Figure 1:
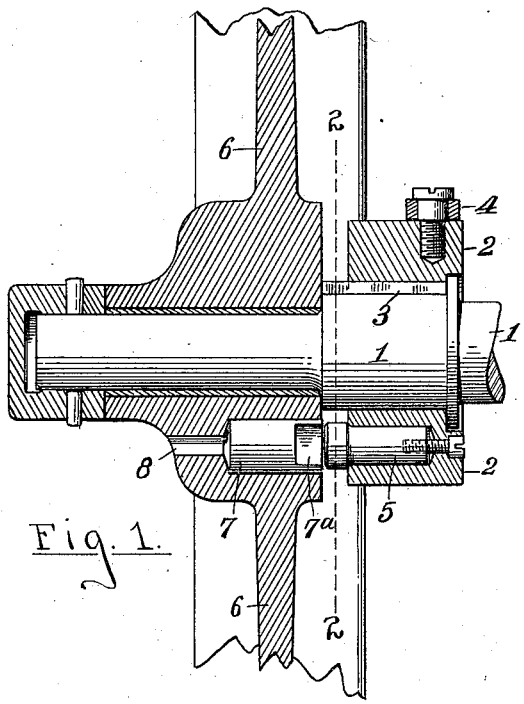
Figure 2:
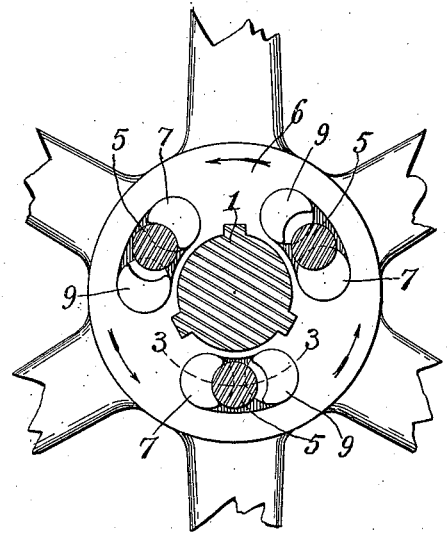
Figure 7:
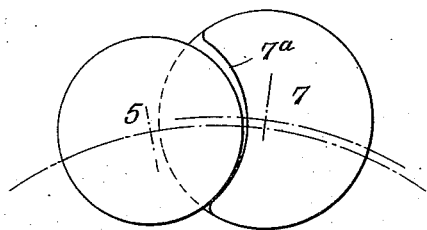
Figure 3:
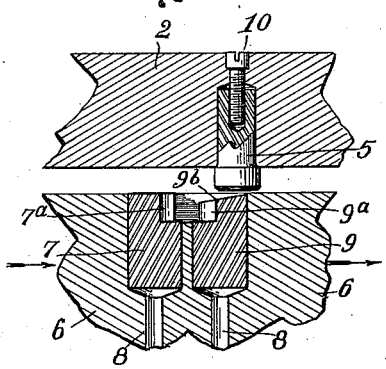
Figure 8:
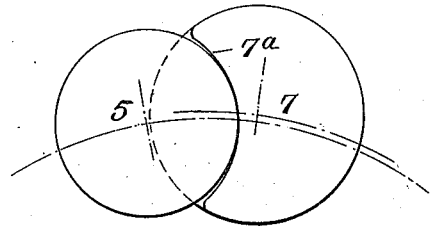
Figures 4, 5, 6:
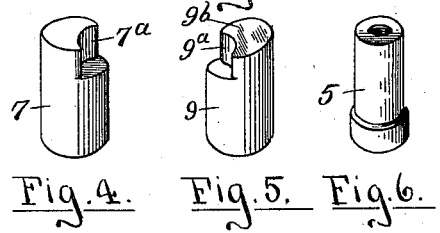

Referring to the accompanying drawings which represent an embodiment of my invention:—Figure 1 is a vertical section of the device; Fig. 2 is an elevation of the hub of the fly wheel with the shaft and pins shown in vertical section; Fig. 3 is a horizontal section on the curved line 3—3 of Fig. 2; Figs. 4, 5 and 6 respectively are perspective views of the adjustable engaging clutch members; and Figs. 7 and 8 diagrams illustrating the adjustable arrangement of the said clutch members.

Like numbers refer to like parts in all of the figures.

1 represents the main shaft of a punch press or other like machine; 2 a collar slidable on the shaft and splined to the same as at 3, 4 any convenient means for sliding the collar. 5 a hardened steel pin projecting from the collar to constitute a clutch member of which there are preferably three. These pins are held in the collar by a screw and are rotatively adjustable to bring the wear upon the different portions of the circumference of the projecting portions thereof as occasion may require.

6 represents the fly wheel freely rotative on the shaft in the hub of which are inserted clutch members to engage the projecting end of the pin 5. These members consist of cylindrical bodies 7 and 9 preferably of hardened steel the member 7 having its end in the plane of the surface of the hub of the fly wheel and provided at one side with a concave recess 7$^a$ of slightly greater radius than the pin 5. This clutch member 7 being rotative in the socket will adjust to fit the pin if said pin and member should chance to be inserted at different distances from the axis of the shaft.

9 is an opposing clutch member of substantially the same shape as the member 7 except that the end is inclined inward to permit the pin 7 to slide inward across the end thereof as the collar is forced toward the fly wheel to engage the clutch. This member is also of hardened steel and thus withstands the wear of the pin sliding thereon. This member 9 is not very essential, but I prefer its use to protect the hub from wear. The clutch members 7 and 9 are preferably of somewhat greater diameter than the pin 5 and extending through the hub opposite each is a small opening 8 through which a rod may be inserted to drive out the clutch members 7 and 9 as occasion may require.

It will be noted that the pin 5 and clutch members 7 and 9 are very easily and cheaply manufactured of high grade steel and can be readily hardened and thus adapted to stand a considerable amount of wear and shock before requiring replacement. So also that the adjustability of the members 7 and 9 about their axes enables me to adjust the recesses therein to accurately engage the end of the pin should occasion require.

What I claim is:—

1. A clutch, comprising a driving member and a driven member, a round pin inserted in one of said members and projecting therefrom and a round pin detachably inserted in the other member and having a concave lateral recess engaged by the first named pin.

2. A clutch, comprising a driving member and a driven member, a round pin in one member and projecting therefrom, and a pin rotatively adjustable in the other member and having a concave lateral recess to receive the end of the first named pin.

3. A clutch, comprising a driving member and a driven member, a round pin inserted in one member and projecting therefrom, a round pin inserted in the other member and having a concave lateral recess to receive the end of the first named pin, both pins being rotatively adjustable in the respective members.

4. A clutch, comprising a driving member and a driven member, a round pin inserted in one member projecting therefrom and rotatively adjustable therein, two round pins embedded in the other member each having a concave lateral recess to receive the end of the first named pin, one of said last named pins having its end in the plane of the face of the member, and the other having its end inclined inward from said plane.

5. A clutch, comprising a driving member rotative on a shaft, a driven member splined to the shaft, a round pin inserted in one member and projecting therefrom, two round pins embedded in the other member, and spaced apart, each of said last named pins having a concave lateral recess to receive the end of the last named pins, one of said last named pins having its end in the plane of the face of said member and the other of said pins having its end inclined inward from said face, and all of said pins being rotatively adjustable.

In testimony whereof I affix my signature in presence of two witnesses.

GEORGE KURSCHUS.

Witnesses:
W. C. KELLY,
WM. L. THORPE.

---

Copies of this patent may be obtained for five cents each, by addressing the "Commissioner of Patents, Washington, D. C."